(12) United States Patent
Miller et al.

(10) Patent No.: US 7,726,909 B2
(45) Date of Patent: Jun. 1, 2010

(54) APPARATUS, SYSTEM, AND METHOD FOR CONCURRENTLY LAYING MULTIPLE PIPELINES

(75) Inventors: Beverly A. Miller, Rock Springs, WY (US); William H. Miller, Rock Springs, WY (US); Christopher S. Shannon, Rock Springs, WY (US)

(73) Assignee: Hi-Pointe Management Services, Inc, Rock Springs, WY (US)

( * ) Notice: Subject to any disclaimer, the term of this patent is extended or adjusted under 35 U.S.C. 154(b) by 0 days.

(21) Appl. No.: 12/249,895

(22) Filed: Oct. 10, 2008

(65) Prior Publication Data
US 2009/0097922 A1   Apr. 16, 2009

Related U.S. Application Data

(60) Provisional application No. 60/978,857, filed on Oct. 10, 2007.

(51) Int. Cl.
*F16L 1/028* (2006.01)
(52) U.S. Cl. ............ 405/184.5; 405/174; 405/156
(58) Field of Classification Search ............ 405/154.1, 405/156, 174, 178, 184, 184.5, 184.4
See application file for complete search history.

(56) References Cited

U.S. PATENT DOCUMENTS

| | | | | |
|---|---|---|---|---|
| 2,605,202 A | * | 7/1952 | Reynolds | 405/156 |
| 3,729,360 A | | 4/1973 | McElroy | |
| 3,744,259 A | * | 7/1973 | Wagley | 405/174 |
| 3,789,614 A | * | 2/1974 | Rogers | 405/182 |
| 4,130,925 A | * | 12/1978 | Gibson | 405/174 |
| 4,352,708 A | | 10/1982 | McElroy | |
| 4,452,550 A | * | 6/1984 | Hofmeester | 405/184.5 |
| 4,990,209 A | | 2/1991 | Rakes | |
| 5,522,699 A | * | 6/1996 | Smith | 405/184.5 |
| 6,021,832 A | * | 2/2000 | McElroy et al. | 156/359 |
| 6,561,731 B1 | * | 5/2003 | Clare et al. | 405/184.5 |
| 6,899,842 B1 | * | 5/2005 | Corre et al. | 405/184.5 |
| 6,953,305 B2 | | 10/2005 | John et al. | |
| 7,267,141 B1 | * | 9/2007 | De Meyer et al. | 405/156 |
| 2003/0039509 A1 | | 2/2003 | McIvor | |
| 2006/0048897 A1 | | 3/2006 | Temple | |

FOREIGN PATENT DOCUMENTS

CA       1283520       4/1991

\* cited by examiner

*Primary Examiner*—Frederick L Lagman
(74) *Attorney, Agent, or Firm*—Kunzler Needham Massey & Thorpe

(57) ABSTRACT

An apparatus, system, and method are disclosed for concurrently forming a plurality of pipelines. The apparatus includes a support chassis coupled to at least one transportation facilitation member. The transportation facilitation member facilities the movement of the support chassis along a surface. A first pipe fuser is disposed on the support chassis and is configured to fuse a first section of pipe to a first pipeline. A second pipe fuser may also be disposed on the support chassis. The second pipe fuser may be configured to independently fuse a second section of pipe to a second pipeline. The first pipe fuser fuses the first section of pipe to the first pipeline with the support chassis in a stationary position. The second pipe fuser fuses the second section of pipe to the second pipeline with the support chassis in the same stationary position.

20 Claims, 12 Drawing Sheets

APPARATUS, SYSTEM, AND METHOD FOR CONCURRENTLY LAYING MULTIPLE PIPELINES

CROSS-REFERENCES TO RELATED APPLICATIONS

This application claims priority to U.S. Provisional Patent Application No. 60/978,857 entitled "Apparatus, system and method for simultaneously laying multiple pipelines" filed on Oct. 10, 2007 Miller et al., which is incorporated herein by reference.

FIELD OF THE INVENTION

This invention relates to fusion of sections of pipe to create a pipeline and more particularly relates to an apparatus, system and method for concurrently laying multiple pipelines.

DESCRIPTION OF THE RELATED ART

Polyethylene pipe is used to transport a variety of fluids from one location to another. To create a pipeline, individual sections of pipe are laid out, or strung along the side of a ditch. To dig the ditch and lay the sections of pipe an access road must be built. Environmental concerns including permits and regulations restrict the width of the access road and ditch to a distance of no greater than 75 feet. This leaves little room for the equipment necessary to create the pipeline.

Further, the pipe sections that are laid on the ground and are subject to dirt and debris which may damage the individual pipe sections. The pipe sections may be pre-strung days, weeks or months before they are fused into a pipeline subjecting the pipe sections to weather conditions. Additionally, with the pipe sections lying on the ground, dirt and debris collects inside the pipe over time. Similarly, animals use the pipe sections as a nesting site and may end up being fused into the pipeline when the pipe sections are connected. Any material that collects within the pipeline must be removed prior to using the pipeline.

There are several additional problems with the conventional method of creating a pipeline. First, the pipe sections must first be laid out alongside the ditch requiring at least one day worth of labor. This additional step necessitates additional manpower to create the pipeline. Another problem is that the pipe fuser deposits the pipeline next to the ditch. The pipeline must then be placed into the ditch with additional manpower and equipment.

Another problem with the conventional method of creating a pipeline is that any tie-ins necessary to run additional pipelines must be fused to pipeline in the ditch or on the ground subjecting the weld to dirt and debris and compromising the integrity of the joint.

In natural gas operations two pipelines must be laid. One pipeline provides water to the hydrocarbon formation to produce a chemical reaction which then produces the natural gas. Another pipeline transports the natural gas produced by the chemical reaction to the desired location. These two pipelines may be of different diameters and/or thicknesses. The conventional system lays two pipelines next to each other in a common ditch to accommodate the water and natural gas. The two pipelines require at least two passes along side of the ditch to create each pipeline. This additional step necessitates additional manpower to create two pipelines. Similarly, the ditch must be wide enough to accommodate two pipelines creating environmental concerns with additional destruction of the land surface.

Additionally, over the course of a day where two pipelines are positioned next to each other within the ditch the pipelines expand and contract according to normal environmental heating and cooling of the pipeline. This expansion and contraction of the pipelines may cause the two pipelines to rub against one another causing abrasions to one pipeline or the other. To avoid such abrasions, the pipelines are required to be spaced a minimum of 6 inches apart, necessitating at least a 6 inch wider ditch.

SUMMARY

From the foregoing discussion, it should be apparent that a need exists for an apparatus, system and method for concurrently laying a plurality of pipelines. Beneficially, such an apparatus, system and method would independently but substantially concurrently fuse at least two pipelines such that a single pass of the apparatus produces at least two pipelines.

The present invention has been developed in response to the present state of the art, and in particular, in response to the problems and needs in the art that have not yet been fully solved by currently available pipe fusers. Accordingly, the present invention has been developed to provide an apparatus, system, and method for concurrently fusing a plurality of pipelines that overcome many or all of the above-discussed shortcomings in the art.

The apparatus to concurrently form a plurality of pipelines includes at least one transportation facilitation member coupled to a support chassis. The transportation facilitation member facilitates the movement of the support chassis along a surface. A pipe fuser is disposed on the support chassis. The pipe fuser is configured to fuse a first section of pipe to a first pipeline and independently fuse a second section of pipe to a second pipeline. The pipe fuser independently forms the two fused pipelines at substantially the same rate. A positioning member coupled to the pipe fuser positions the pipe fuser in a first position to fuse the first section of pipe to the first pipeline. Alternatively, the positioning member is disposed on the support chassis and engages the pipe fuser. In one embodiment, the positioning member also positions the pipe fuser in a second position to fuse the second section of pipe to the second pipeline.

In certain embodiments the first section of pipe and the first pipeline are of a different size than the second pipe section and the second pipeline. In one embodiment the apparatus to concurrently form a plurality of pipelines also includes a second pipe fuser positioned and configured to fuse the second section of pipe to the second pipeline concurrent with the first pipe fuser fusing the first section of pipe to the first pipeline.

In one embodiment a pipe section guide is connected to the support chassis. The pipe section guide is configured to align a section of pipe with a pipeline for fusion of the section of pipe to the pipeline by the pipe fuser.

In another embodiment a pipeline guide is connected to the support chassis. In one embodiment, the pipeline guide is positioned to support and align the pipeline for fusion of the pipe section to the pipeline by the pipe fuser. In another embodiment, the pipeline guide may be configured to deposit the fused pipeline into a ditch with the fused pipelines positioned within the ditch. The pipeline guide may deposit the fused pipelines in a vertical orientation with respect to each other.

A ditch digger may be configured to pull the support chassis forward along the surface. The ditch digger may also dig a ditch proportioned to receive the fused pipelines in conduction with or while pulling the support chassis.

In certain embodiments the support chassis is proportioned to span a ditch proportioned to receive the fused pipelines. Thus, in certain embodiments the ditch may be in the center of a road rather than to one side or the other and the support chassis drives over the ditch thereby lessening the environmental impact of the ditch and access road.

A entry platform may be coupled to the support chassis in certain embodiments. The entry platform includes a base and one or more keepers which retain a plurality of unfused sections of pipes above the surface. The entry platform transports the plurality of unfused sections of pipe above the surface in front of the support chassis.

In another embodiment an apparatus for concurrently forming a plurality of pipelines includes a support chassis coupled to at least one transportation facilitation member. The transportation facilitation member facilies the movement of the support chassis along a surface. A first pipe fuser is disposed on the support chassis and is configured to fuse a first section of pipe to a first pipeline. A second pipe fuser is also disposed on the support chassis. The second pipe fuser is configured to independently fuse a second section of pipe to a second pipeline. In one embodiment, the first pipe fuser fuses the first section of pipe to the first pipeline with the support chassis in a stationary position and the second pipe fuser fuses the second section of pipe to the second pipeline with the support chassis in the same stationary position.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 2 through 9, is not intended to limit the scope of the invention, as claimed, but is merely representative of selected embodiments of the invention.

Figure 1:
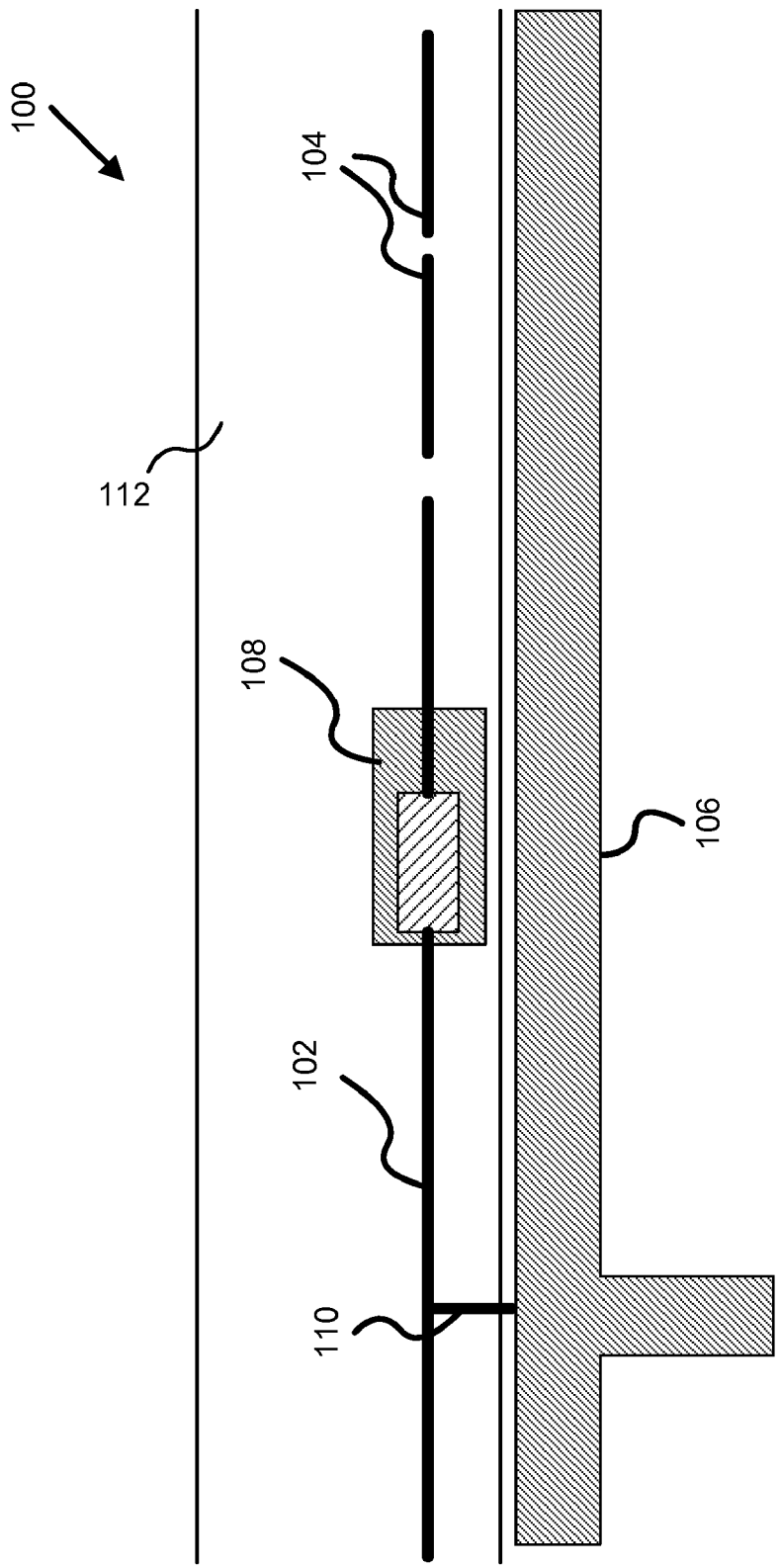
FIG. 1 is an illustration depicting a prior art method for depositing a single pipeline within a ditch

FIG. 1 illustrates a schematic block diagram of a prior art system 100 for creating a pipeline in which a pipeline 102 is created from individual sections of pipe 104. According to this system, sections of pipe 104 are laid out along a ditch 106. To dig the ditch 106 and lay the sections of pipe 104, an access road 112 must be built. The pipe sections 104 are laid on the ground and are subject to dirt and debris which may damage the pipe sections 104. The pipe sections 104 may be pre-strung days, weeks or months before they are fused into a pipeline 102 subjecting the pipe sections 104 to weather conditions. Additionally, with the pipe sections 104 lying on the ground, dirt and debris collects inside the pipe over time. Similarly, animals use the pipe sections 104 as a nesting site and may end up being fused into the pipeline 102 when the pipe sections 104 are connected. Any material that collects within the pipeline 102 must be removed prior to using the pipeline 102.

The prior art system illustrated in FIG. 1 has several inherent problems aside from dirt, debris and animals damaging the pipe sections 104. For example, pipe sections 104 must first be laid out along side the ditch 106 requiring at least one day worth of pipe be pre-strung before fusing can begin. This additional step necessitates additional manpower to create a pipeline 102. Another problem with the system 100 is that the pipe fusing apparatus 108 deposits the pipeline 102 next to the ditch 106. This requires the access road 112 to be built and maintained next to the ditch 106. The pipeline 102 must then be lowered into the ditch 106. The additional steps of building an access road 112 and lowering the pipeline into the ditch necessitates additional manpower to create a pipeline 102. Similarly, tie-in 110 must be fused to pipeline 102 in the ditch 106 or on the ground subjecting the weld to dirt and debris and compromising the integrity of the joint.

Another problem relating to the system 100 illustrated in FIG. 1 arises from the fact that two pipelines must be laid in one ditch 106 one for water and one for gas. The system 100 lays two pipelines next to each other. This requires two passes along side of the ditch 106. This additional step necessitates additional manpower to create a pipeline 102. Similarly, the ditch 106 must be wide enough to accommodate two pipelines creating environmental concerns with additional destruction of the lands surface.

Additionally, over time the pipeline 102 expands and contracts according to normal heating and cooling of the pipeline 102. This expansion and contraction of the pipelines may cause the two pipelines to rub against one another causing abrasions to one pipeline or the other. To avoid such abrasions, the pipelines are often required to be spaced a minimum of 6 inches apart, necessitating at least a 6 inch wider ditch 106. Further, the sides of the pipelines must have at least 6 inches of clearance with the side of the ditch 106. The spacing of the pipelines as well as the clearance on each side of the pipelines mandates a wider ditch 106 be dug to accommodate the two pipelines. In the system 100 the ditch 106 must be about 24 inches to 54 inches wide to accommodate the two pipelines as well as to accommodate the required spacing between the pipelines and clearance on the sides of the pipelines.

Further, as discussed above, in the system 100 an access road 112 must be built that parallels the ditch to allow machinery access to the ditch 106. The access road 112 must be wide enough to accommodate both the pipe sections 104 as well as the pipe fusing apparatus 108. However, environmental concerns mandate a 75 foot area in which to dig the ditch 106, build the access road 112 and pile the material removed from the ditch 106. Therefore, it is clear that any reduction in the width of the ditch 106 or the width of the access road 112 would be an improvement in the art.

Figure 2A:
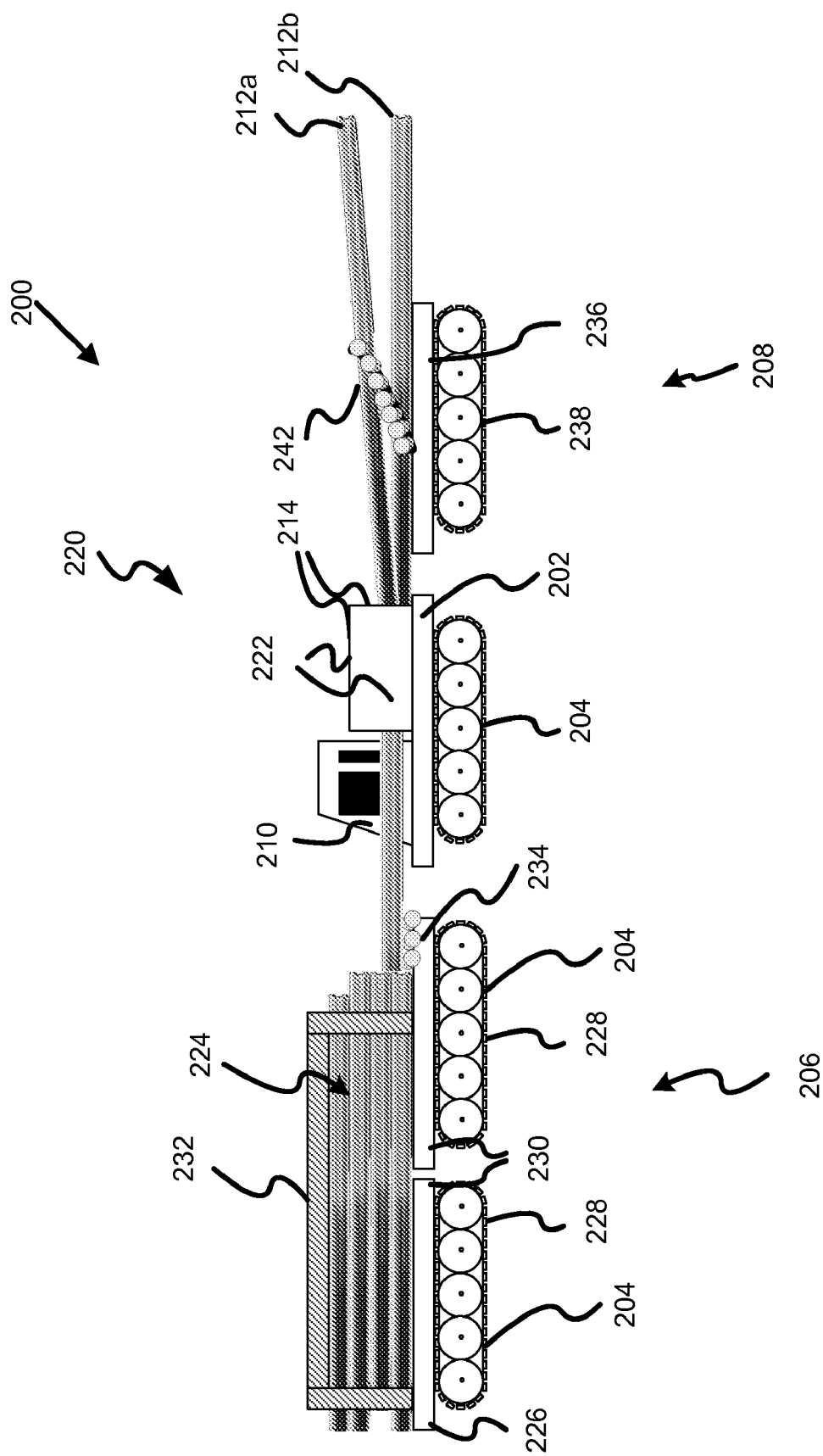
FIG. 2A is an illustration depicting a side view of one embodiment for concurrently laying multiple pipelines in accordance with the present invention.
Figure 2B:
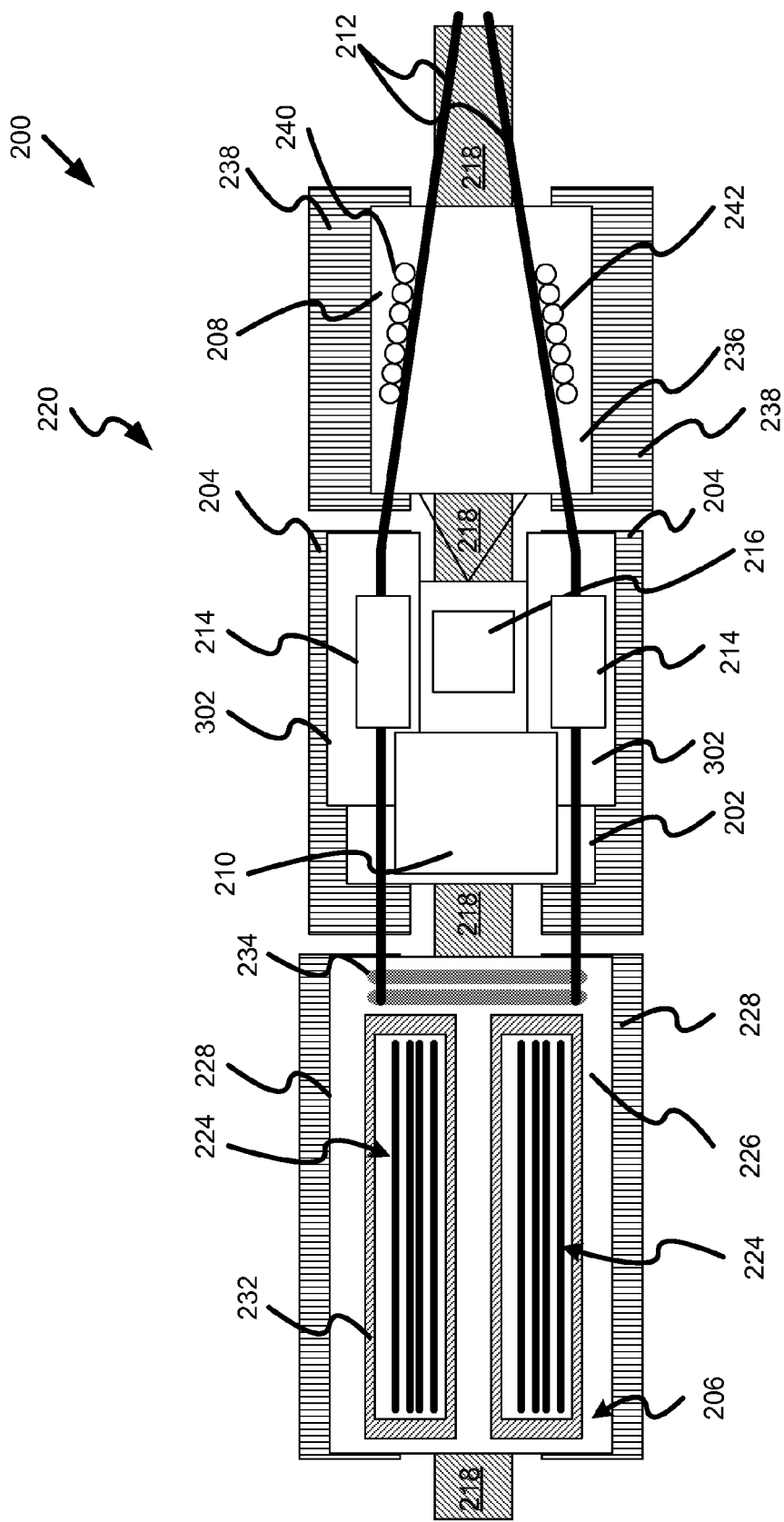
FIG. 2B is an illustration depicting a top view of one embodiment for concurrently laying multiple pipelines in accordance with the present invention.

FIG. 2a and FIG. 2b illustrate schematic block diagrams depicting one embodiment of a system 200 for simultaneously laying multiple pipelines 212 in accordance with the present invention. The system 200 may include a support chassis 202 coupled to a plurality of transportation facilitation members 204. In certain embodiments an entry platform 206 may optionally be disposed before the support chassis 202 and an exit platform 208 may optionally be disposed behind the support chassis 202. In certain embodiments the entry platform 206 and exit platform 208 are integral with the support chassis 202 such that the support chassis 202, entry platform 206 and exit platform 208 are all a single unit.

In certain embodiments the entry platform 206 may be configured to hold a plurality of pipe sections 224. In one embodiment, the entry platform 206 is the width of the support chassis. In one embodiment, the entry platform 206 is at least as long as the pipe sections 224. A propulsion mechanism 210 such as a motor may be disposed on the support chassis 202 to provide a motive force to the support chassis 202. In certain embodiments the propulsion mechanism 210 is a motor and transmission disposed on the support chassis. In another embodiment the propulsion mechanism is a motor in another vehicle which pulls or pushes the chassis 202 along a surface. The system 200 may include a plurality of pipe fusers 214 coupled to an electric generator 216 for supplying electrical current to the pipe fusers 214.

In the embodiment illustrated in FIG. 2a and FIG. 2b the transportation facilitation members 204 may comprise a track such as that found on a snowcat, tractor, tank or other such heavy machinery. The transportation facilitation members 204 may be spaced wide enough to straddle a ditch 218. The ditch 218 is substantially similar to the ditch 106 illustrated in FIG. 1. However, the ditch 218 of FIG. 2 may be constructed much narrower than ditch 106 because the pipelines 212 can be disposed vertically within the ditch 218 as described further herein. The present invention will allow the ditch 218 to be as narrow as approximately fifteen (15) inches wide when a three inch diameter pipe is used. The depth of the ditch 218 may be determined by the depth at which the pipeline must be placed. For instance, in certain embodiments the pipeline may carry water or other liquid with a relatively high freezing temperature which may need to be placed below the frost line. Accordingly, in certain embodiments the depth of the ditch 218 may vary to account for frost lines. In one embodiment of the present invention, the ditch may be approximately forty eight (48) inches deep. In certain embodiments, such as where gas and electric lines are run together, the ditch 218 may be constructed twenty four (24) to thirty six (36) inches deep. Thus, the transportation facilitation members 204 may be placed closer together than would otherwise be possible where the pipelines are place parallel on a horizontal plane such as is required in the prior art system 100.

In one embodiment an individual track may be of such a width as to support the support chassis 202 and other components located on the support chassis 202. The track 204 may be wide enough to support the machinery in muddy or snowy conditions. In certain embodiments the track may be a metal track as is known in the art. Alternatively, where the machine is to be used on pavement, the track may comprise a rubberized material as is also known in the art. A rubber track may provide less damage to pavement and may therefore be desirable in some circumstances. While the illustrated embodiment shows the transportation facilitation members 204 as a track, it is envisioned that the present invention could utilize a plurality of wheels as the transportation facilitation members 204. Similarly, in certain embodiments transportation facilitation members 204 may comprise a set of wheels. In one embodiment transportation facilitation members 204 are sleds that support the support chassis 202 in snowy conditions. In one embodiment transportation facilitation members 204 are skids that slide along a surface. In another embodiment, the transportation facilitation members 204 are floats, buoys, pontoons or the like configured to support the support chassis 202 on water. One of skill in the art will recognize that other transportation facilitation members 204 are within the scope of the present invention. Further, in certain embodiments the transportation facilitation members 204 may be omitted such that the support chassis 202 is stationary.

A plurality of pipe fusers 214 may be disposed on the support chassis 202. In one embodiment, the pipeline laying apparatus contains two pipe fusers 214. The pipe fusers 214 may be located on both sides of the pipe laying apparatus 220. In an alternative embodiment the pipe fusers 214 may be stacked on top of each other to facilitate vertically stacking the pipelines 212 as will be more fully discussed below.

Figure 3:
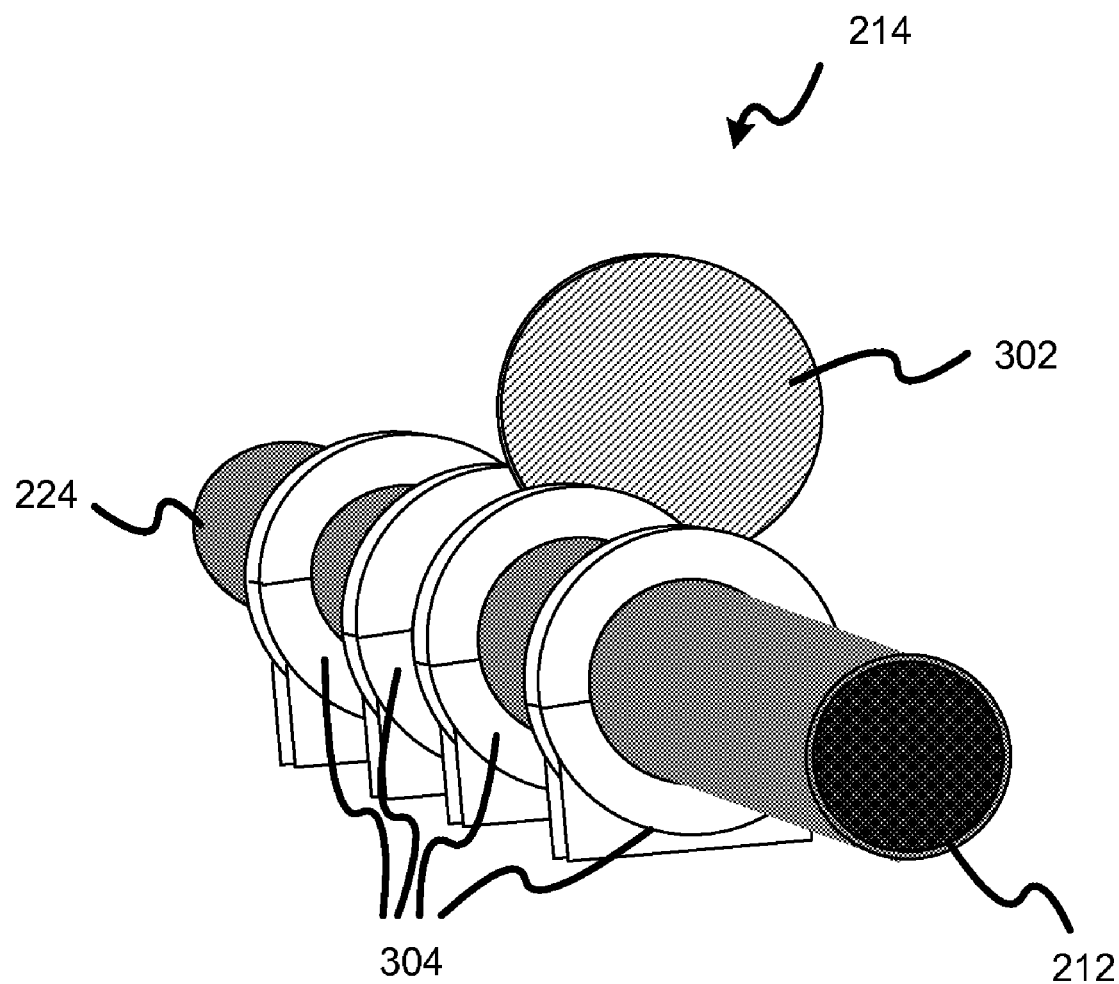
FIG. 3 is a perspective view illustrating a pipe fusing apparatus in accordance with one embodiment of the present invention.

Turning now to FIG. 3, the pipe fusers 214 comprise a fusion apparatus for welding thermoplastic pipe such as polyethylene pipe used in the gas and oil industry. One example of a suitable pipe fuser 214 may be a pipe fuser manufactured and distributed by McElroy Manufacturing, Inc. located in Tulsa, Okla. In certain embodiments each pipe fusers 214 is selected to fuse substantially the same diameter pipe sections 224. In certain applications different diameter pipelines 212 are required for different fluids. For example, in one embodiment a water pipeline 212 may be a different diameter than a gas pipeline 212. Therefore, in one embodiments each pipe fuser 214 may be selected to fuse different size pipe sections 224 to pipelines 212. Alternatively, in adjustable diameter pipe fusers 214 one pipe fuser 214 may be setup for fusing pipe sections 224 of one diameter and/or wall thickness and another adjustable diameter pipe fusers 214 one pipe fuser 214 may be setup for fusing pipe sections 224 of a different diameter and/or wall thickness. Each pipe fuser 214 may independently fuse a different range of pipe diameters. In one embodiment each pipe fuser 214 is configured to fuse a specific diameter pipe. In certain embodiments the diameter of pipe sections 224 used with the present invention ranges from 1 inch to 64 inches. In a certain embodiments the diameter of pipe sections 224 used with the present invention ranges from 1 inch to 24 inches.

The pipe fusers 214 comprise a heating element 302 and a plurality of clamps 304. In certain embodiments the pipe fusers 214 may be enclosed within a housing 222 to protect the joints on the pipeline 212 from being contaminated with dirt and debris. Housing 222 may also protect the pipe fusers 214 from corrosion from the elements. While FIG. 2a and FIG. 2b illustrate an embodiment wherein the pipe fusers are enclosed within a housing 222, it is understood that housings 222 may be eliminated in other embodiments.

The clamps 304 are spaced apart and held in an upright parallel position. In one embodiment the clamps 304 on pipe fusers 214 may be hydraulically operated. In certain other embodiments the clamps 304 may be manually opened and closed. The clamps 304 may be configured to hold a pipe section 224 in a mating relationship with another pipe section 224 or with the pipeline 212. Thus, pipe fusers 214 increase the length of the pipeline 212 by one pipe section 224 length with each weld.

In certain embodiments the heating element 302 is electrically coupled to a generator 216 to provide an electrical current to heat the heating element 302. The heating element 302 is movably positioned between a pair of clamps 304. In a preferred embodiment, heating element 302 is positioned between a center pair of clamps 304. As discussed above, the clamps 304 align the pipe section 224 in a mating relationship with the pipeline 212. The heating element 302 heats the pipe section 224 and the pipeline 212 to a temperature sufficient to fuse the pipe section 224 to the pipeline 212. In certain embodiments a smaller diameter pipe section 224 requires less energy to heat than a larger diameter pipe section 224 due to the smaller surface area. Additionally, in certain embodiments the wall of the pipe section 224 is variable. That is, in certain embodiments the material comprising the material between the inner diameter of the pipe section 224 and the outer diameter of the pipe section 224 is different depending on the use to which the pipeline 212 will be put. A thicker pipe wall, having additional material, will ordinarily required a greater heating temperature or a greater amount of time to heat than a thinner pipe wall. Accordingly, one skilled in the art will recognize that different sized pipe sections 224 and pipelines 212 may require different heating temperatures and/or heating times to properly fuse the pipe section 224 to the pipeline 212. Thus, in one embodiment two pipe fusers 214 are provided to concurrently fuse different sized pipe sections 224 to the different sized pipelines 212.

Referring now to FIG. 2b, a propulsion mechanism 210 may be provided on support chassis 202 to move the support chassis 202. The propulsion mechanism 210 may comprise a diesel or gasoline engine coupled to the transportation facilitation members 204 to provide a motive force. In other embodiments the propulsion mechanism may be disposed on the entry platform 206 or on the exit platform 208. In certain embodiments, the propulsion mechanism may comprise a separate mobile unit (not shown) that pulls or pushes a plurality of trailers which contain the various components of the system 200 as described herein. The separate mobile unit may comprise conventional construction machinery configured to both pull the system 200 and dig the ditch 218. For example, in one embodiment a front loader pulls the support chassis 202. The front loader may also load pipe sections 224 onto the support chassis 202 and into the pipe fusers 214. In another embodiment a ditch digger is configured to pull the support chassis 202 as well as dig the ditch 218. In one embodiment a flatbed truck is configured to pull the support chassis 202 with the bed of the flatbed truck acting as an entry platform 226 (further described below) to hold unfused pipe sections 224.

Referring again to FIG. 2a and FIG. 2b, entry platform 206 may comprise a separate mobile unit as depicted in the illustrated embodiments. The separate mobile unit may comprise an entry platform 226 coupled to one or more transportation facilitation members 228. The transportation facilitation members 228 may be spaced wide enough to straddle a ditch 218. In one embodiment an individual track 228 may be of such a width as to support the entry platform 226 and other components located on the entry platform 226. The track 228 may be wide enough to support the machinery in muddy or snowy conditions. In certain embodiments the track is a metal track as is known in the art. Alternatively, where the machine is to be used on pavement, the track may comprise a rubberized material as is also known in the art. A rubber track may provide less damage to pavement and may therefore be desirable in some circumstances. While the illustrated embodiment shows the transportation facilitation members as a track 228, it is envisioned that the present invention could utilize one or more wheels as the transportation facilitation members 228.

While the entry platform 206 is illustrated in FIG. 2b as a separate mobile unit, it is within the scope of the present invention to provide an entry platform that is unitary with the support chassis 202. Alternatively, as shown in FIG. 2a, the entry platform 206 may comprise one or more mobile units 230. One skilled in the art will recognize that the entry platform may be any device that is configured to carry the pipe sections 224 and support the pipe sections 224 so that they are retained above the ground and available for fusing when needed. For example, in certain embodiments the entry platform 206 may be a sled, a cart, a trailer or the like arranged to carry pipe sections 224 above the ground. By maintaining the pipe sections 224 above the ground, the pipe sections 224 can be fused to the pipeline 212 without contaminating the pipeline 212 with dirt and debris.

In one embodiment one or more keepers 232, configured to maintain pipe sections 224 on the entry platform 206 is disposed on the entry platform 206. In certain embodiments the one or more keepers 232 cooperates with rollers 234 to align pipe sections 224 to enter the pipe fusers 214. In certain embodiments the keepers 232 include a wire, a strap, a rope or other pliable material that is positioned over the pipe sections 224 to keep the pipe sections 224 on the entry platform 206. In one embodiment, the keepers 232 include a rigid retaining member such as a wall, a bar, a lip, a pipe section guide, a flange, a post or the like that hold the pipe sections 224 on the entry platform 206. In certain embodiments the keepers 232 have a "U," "V," or "W" shaped cross section that funnels the pipe sections 224 to a central area in the valley(s) of the keeper 232. In this manner a single pipe section 224 may be aligned with a pipe fuser 214 by gravity. On skilled in the art will recognize that the keepers 232 may be configured to hold any size pipe section 224 commercially available. In one embodiment the keepers 232 are sized to hold pipe sections 224 with diameters ranging from 1 inch to 64 inches. In a preferred embodiment the keepers 232 are sized to hold pipe sections 224 ranging from 1 inch to 24 inches. One skilled in the art will recognize that keepers 232 may be sized to hold pipe sections 224 according to the size of pipe section 224 that the pipe fuser 214 can accommodate.

In another embodiment an exit platform 208 may comprise a separate mobile unit as depicted in the illustrated embodiments. The separate mobile unit may comprise an exit platform chassis 236 coupled to one or more transportation facilitation members 238. The transportation facilitation members 238 may be spaced wide enough to straddle a ditch 218. In one embodiment an individual track 238 may be of such a width as to support the exit platform chassis 236 and other components located on the exit platform chassis 236. The track 238 may be wide enough to support the machinery in muddy or snowy conditions. In certain embodiments the track may be a metal track as is known in the art. Alternatively, where the machine is to be used on pavement, the track may comprise a rubberized material as is also known in the art. A rubber track may provide less damage to pavement and may therefore be desirable in some circumstances. While the illustrated embodiment shows the transportation facilitation members as a track 238, it is envisioned that the present invention could utilize one or more wheels as the transportation facilitation members 238.

While the exit platform 208 is illustrated in FIG. 2a and FIG. 2b as a separate mobile unit, it is within the scope of the present invention to provide an entry platform that is unitary with the support chassis 202. In another embodiment the entry platform 226, the support chassis 202 and the exit platform 206 may all be integral such that the entry platform 226, the support chassis 202 and the exit platform 206 comprise a single unit.

As pipelines 212a,b exit the pipe fusers 214 the pipelines 212a,b may encounter a series of rollers 240 and 242 configured to manipulate the pipe toward the center of the exit platform 208. One of the series of rollers 242 may be located on either side of exit platform 208 and may be configured to lift and direct one pipeline 212a above and in a parallel relationship to the other pipeline 212b. Thus, the pipelines may be vertically oriented upon exit of the exit platform 208. In certain embodiments the series of rollers 240 and 242 may be hydraulically movable to make fine tune adjustments to the spatial position of the pipelines 212. In certain embodiments the pipelines 212a,b may be placed parallel with each other in a horizontal plane as is the current conventional method. In such instances rollers 242 may simply move the pipeline 212a toward the center of the exit platform 208 without lifting the pipeline 212a above the other pipeline 212b. In one embodiment the pipelines 212a,b may exit the pipe fusers 214 without being further manipulated such that the pipelines 212a,b rest on the ground in a position substantially equal to the distance between the pipe fusers 214. Where the pipeline 212 is not directly fed into the ditch 218, a piece of machinery such as a front loader, back hoe or other device may lift or otherwise move the pipelines 212a,b into the ditch 218.

Where a tie-in 110 such as is shown as in FIG. 1 is necessary, the tie-in 110 may be fused to the pipeline 212 on a pipe alteration platform 908 (illustrated in FIG. 9 and discussed below). Additionally, as discussed below with reference to FIGS. 4-6, in certain embodiments a spacer 400 may be welded to the pipelines 212a,b to keep a predefined distance between the pipelines 212a,b when the pipelines 212a,b are placed into the ditch 218. The pipe alteration platform 908 avoids the welding of tie-ins 110 or spacers to pipelines 212a,b in the ditch or on the ground where contamination is a concern. Additional pipe sections 224 may then be fused to the tie-in 110.

While the embodiments illustrated show the system 200 straddling the ditch 218, it is understood that the invention can be practiced with the apparatus located to one side of the ditch. In such circumstance, the exit platform 208 and rollers 240 and 242 may be configured to deposit the pipelines 218 to one side or the other depending on where the ditch is.

Figure 4:
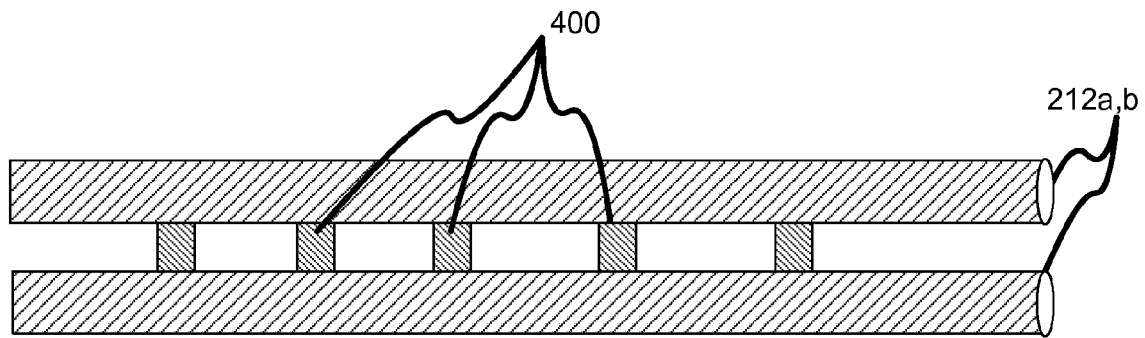
FIG. 4 is an illustration depicting a plurality of pipelines spaced apart by a plurality of spacers in accordance with one embodiment of the current invention.

FIG. 4 illustrates a pair of pipelines 212a,b in vertical orientation upon exit of exit platform 208. Spacers 400 may be disposed between pipelines 212a,b to maintain the pipelines 212 at a predetermined distance apart. In one embodiment spacers 400 may be configured to maintain the pipelines 212 at least six (6) inches apart. As discussed above, when a pipeline 212 heats up and cools down with the typical environmental temperature fluctuation throughout the day, the pipeline 212 expands and contracts. This expansion and contraction can cause the pipelines 212 to contact one another. Contact between the pipelines 212a,b, in most circumstances, should be avoided to avoid compromise of the pipelines 212a, b. Therefore, a spacer 400 is placed between the two pipelines 212a,b to keep them spaced a predefined distance apart. Spacers a position at approximate positions along the length of the pipelines 212a,b. Currently regulations and other considerations suggest a 6 inch space between the pipelines 212a,b is sufficient to avoid contact between the pipelines 212a,b. While the embodiments illustrated and described with reference to FIGS. 4-6 contemplate a six inch spacer 400, one skilled in the art will recognize that the spacers 400 may be proportioned to space the pipelines 212a,b a different distance apart.

Figure 6:
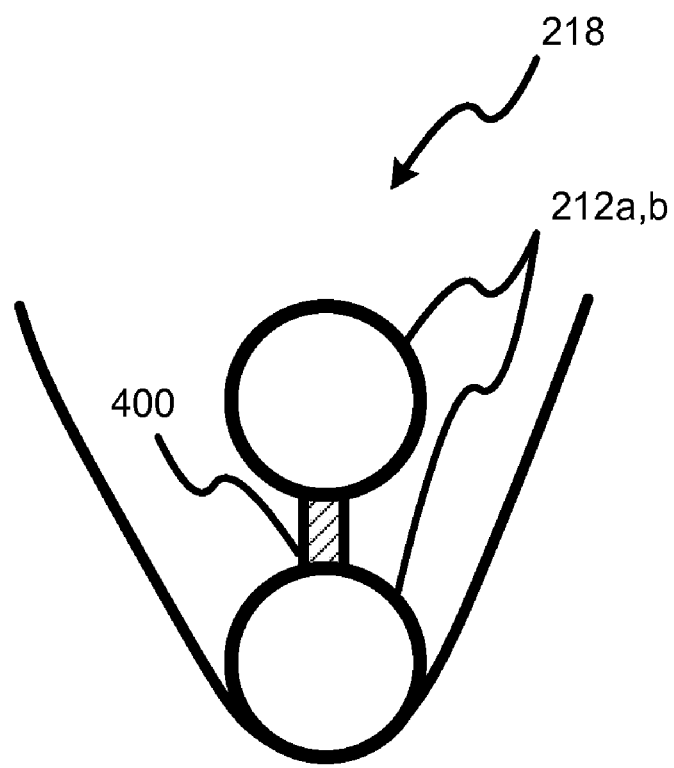
FIG. 6 is an end view depicting a plurality of pipelines spaced apart by a spacer and laid vertically in a ditch in accordance with one embodiment of the current invention.

Spacers 400 may be fused to the pipelines 212a,b on the exit platform 208 or on a pipe alteration platform 908 or may be placed between the pipelines 212 as the pipelines are placed in ditch as illustrated in FIG. 6. To fuse the spacers 400 to the pipelines 212a,b the surface of the spacer 400 that contacts the pipeline 212 and the surface of the pipeline 212 that contacts the spacer 400 is heated to a temperature sufficient to weld the particular plastic or other material that makes up the pipeline 212 and the spacer. The spacer 400 is place in contact with the pipeline 212 and pressure is applied. One skilled in the art will recognize that plastic welding techniques known in the art may be used to weld the spacer 400 to the pipeline 212. Beneficially, a spacer 400 that is welded to pipelines 212 will maintain the pipelines 212a,b at a predefined distance apart event when the ditch 218 is back-filled. In certain embodiments the spacer 400 comprises a sandbag or other material placed between the pipelines 212.

Figure 5:
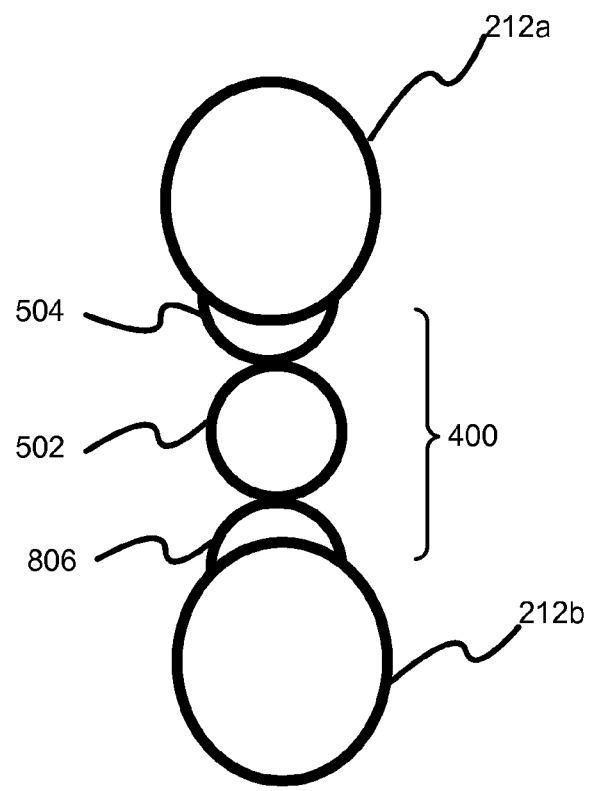
FIG. 5 is a cutaway view depicting a spacer in accordance with one embodiment of the current invention.

FIG. 5 illustrates a cross sectional view of one embodiment of a spacer 400. In certain embodiments the spacer may comprise a piece of polyethylene pipe 502 approximately six (6) inches in diameter. Another piece of polyethylene pipe may be divided into two pieces 504 and 506. The two pieces 504 and 506 may be fused to the polyethylene pipe 502 on one side and fused to the pipelines 212 on the other side according to plastic welding techniques known in the art. In certain embodiments the spacer 400 is not fused to the pipelines 212 but rather is placed between the pipelines 212 as the pipelines 212 are laid in the ditch 218.

FIG. 6 illustrates a cross sectional view of a pair of pipelines 212 disposed in a ditch 218. A Spacer 400 is disposed between pipelines 212. As can be seen from this illustration, ditch 218 may be of a much narrower width than if the pipelines 212 were laid side by side. Thus, a much smaller environmental footprint may be left by the current invention in comparison to the prior art system 100 of FIG. 1.

Figure 7:
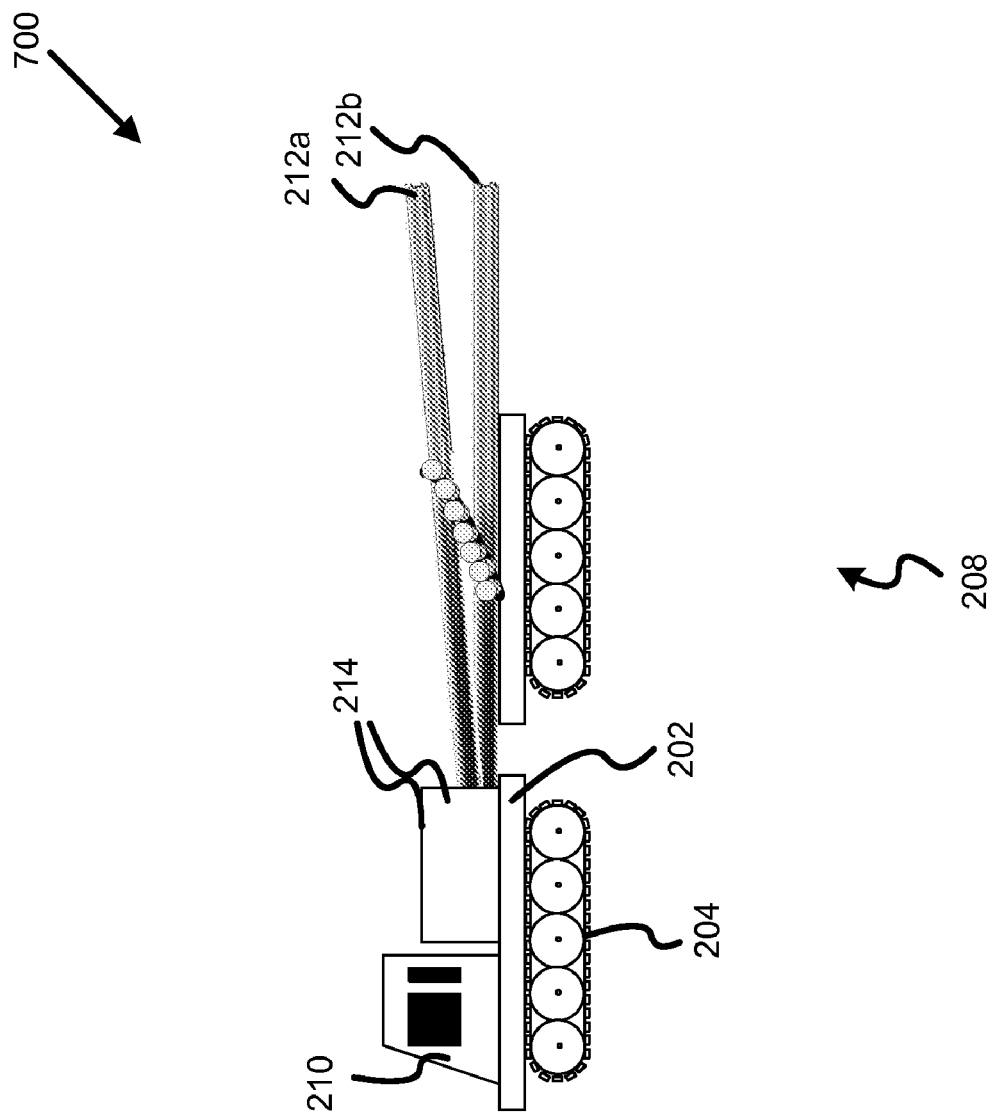
FIG. 7 is an illustration depicting an alternative embodiment of the current invention.

FIG. 7 illustrates an embodiment of the current invention in which the entry platform 206 is not included in the system. In such a system, pipe sections 224 may be pre-strung along side of the ditch. The system 700 may include a support chassis 202 coupled to one or more transportation facilitation members 204. An exit platform 208 may be disposed behind the support chassis 202. A propulsion mechanism 210 may be disposed on the support chassis 202 to provide a motive force to the support chassis 202. The system 200 may include one or more pipe fusers 214 couple to an electric generator (not shown) for supplying electrical current to the pipe fusers 214. The exit platform 208 may be substantially similar to the embodiment describe above.

Figure 8:
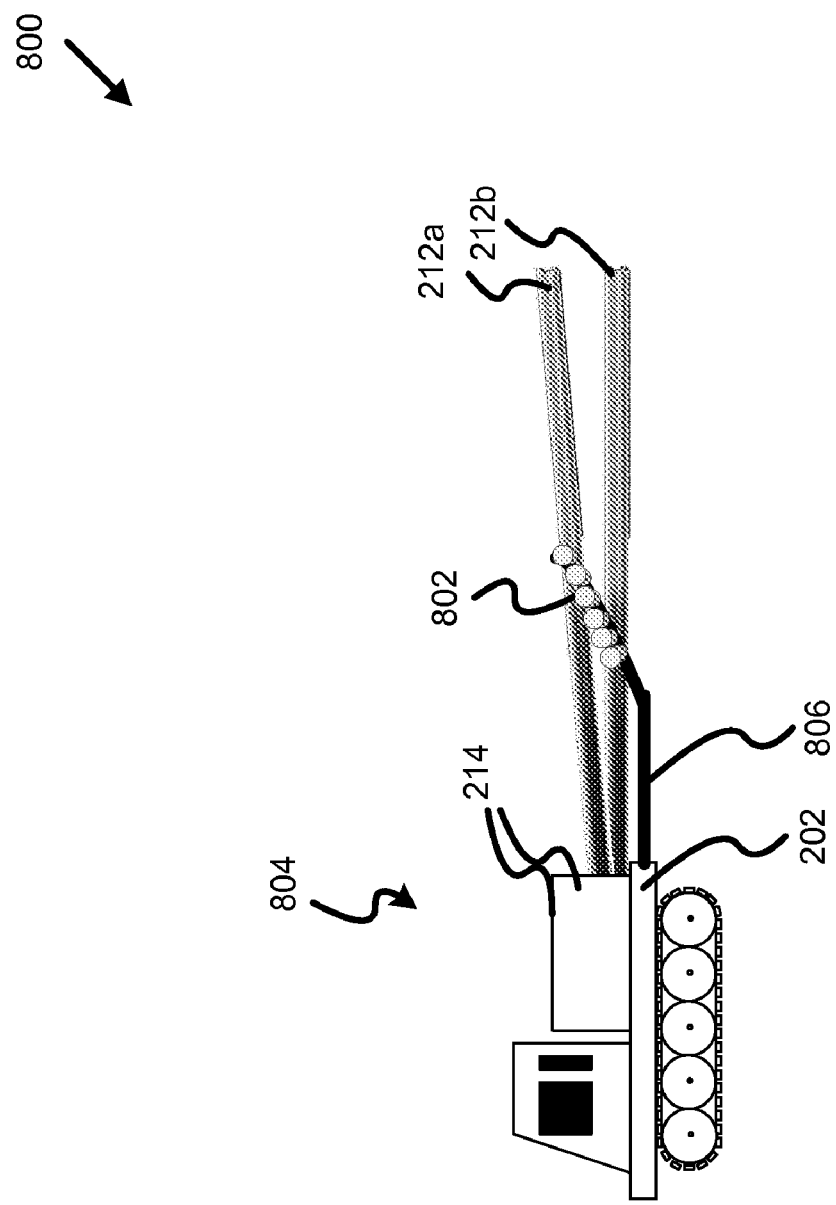
FIG. 8 is an illustration depicting an alternative embodiment of the current invention.

FIG. 8 illustrates an embodiment of a system 800 in which both the entry platform 206 and the exit platform 208 are omitted. In this embodiment, the system 800 may include one or more pipe fusers 214. The plurality of pipe fusers 214 may be substantially similar to the plurality of pipe fusers 214 described above. The pipe fusers 214 may be electrically coupled to a generator to provide electric current. In certain embodiments a number of rollers 802 are configured to manipulate the pipe toward the center of the device 804. The rollers 802 may be positioned closer to or further away from the pipe fusers 214 by an adjustable arm 806. In certain embodiments the arm 806 may be hydraulically operated to extend or withdraw according to the environmental terrain of the area. In one embodiment the angle of the rollers 802 relative to the pipeline exiting one or more fusers 214 is also adjustable to allow a user to position the pipelines 212a,b in a desired configuration or into the ditch 218.

One set of the series of rollers 802 may be located at the exit of a pipe fuser 214 and may be configured to lift one pipeline 212a above and in a parallel relationship to the other pipeline 212b. Thus, the pipelines 212a,b may be vertically oriented relative to the ground upon exit of the exit of the pipe fuser 214. The series of rollers 802 may be hydraulically movable to make fine tuning adjustments to the spatial position of the pipelines 212a,b. In certain embodiments the pipelines 212a,b may be placed parallel in a horizontal plane as is the current conventional method. In such instances rollers 802 may simply move the pipeline 212a toward the center of the exit of pipe fusers 214 without lifting the pipeline 212a above the other pipeline 212b. In other embodiments the rollers 802 may be omitted and the pipelines 212a,b may fall to the surface upon exit of the pipelines 212a,b from the pipe fusers 214.

Figure 9:
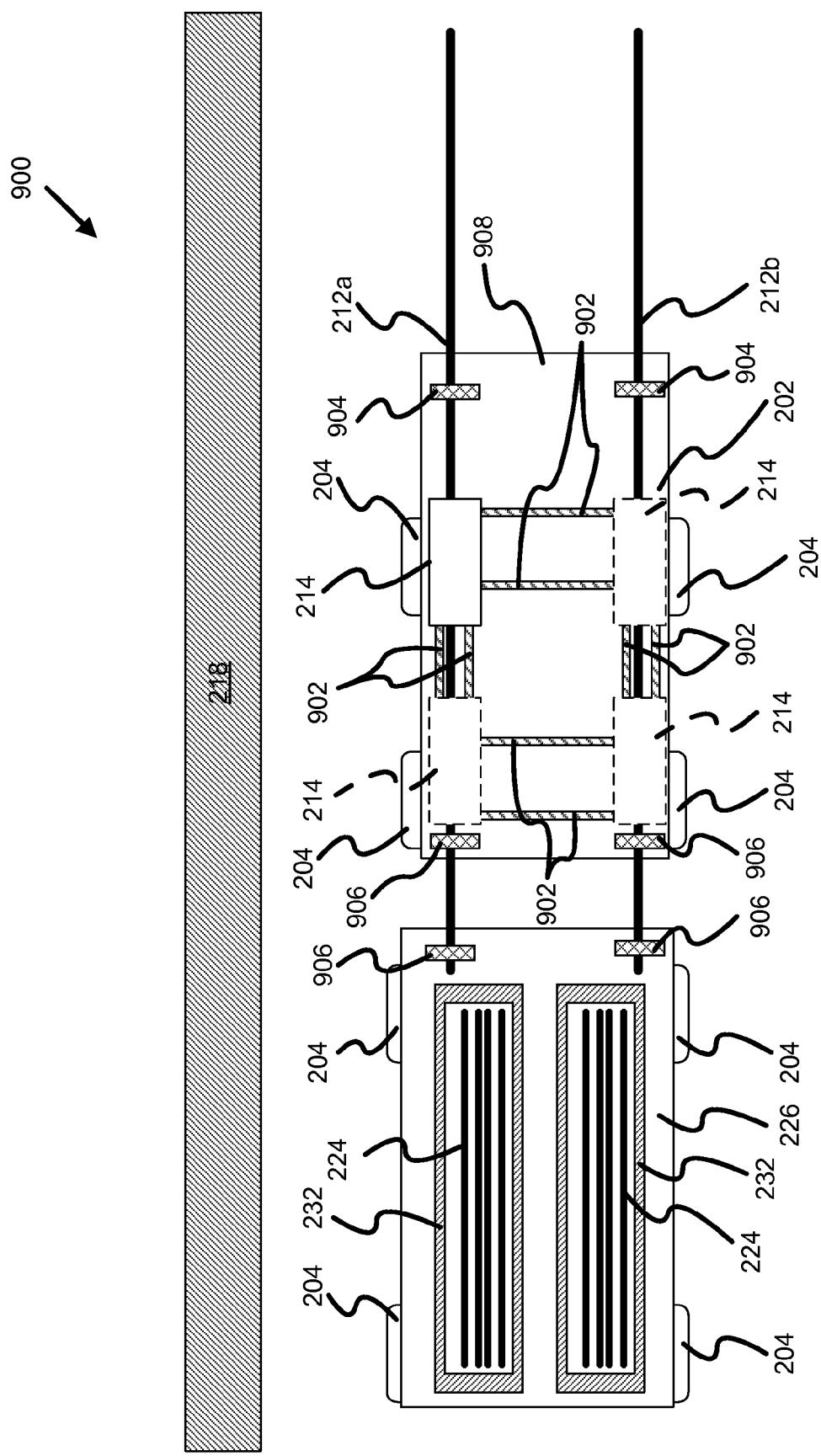
FIG. 9 is an illustration depicting a top view of a single pipe fuser embodiment in accordance with one embodiment of the current invention.

FIG. 9 illustrates an embodiment of a system 900 for concurrently forming at least two pipelines 212a,b. The system includes a support chassis 202, a single pipe fuser 214, one or more positioning members 902, pipeline guides 904, pipe section guides 906, transportation facilitation members 204, entry platform 226 and pipe alteration platform 908.

The support chassis 202 in FIG. 9 is substantially similar to the support chassis 202 describe above. The support chassis 202 provides a substantially planar surface for mounting or affixing the single pipe fuser 214. In certain embodiments the single pipe fuser is not mounted to the support chassis 202 but rather is freely placed upon the substantially planar surface of the support chassis 202. The single pipe fuser 214 is substantially similar to the pipe fuser described above with relation to FIG. 3.

In one embodiment, where the single pipe fuser is placed on the substantially planar surface of the support chassis 202 the single pipe fuser is free to move about the surface of the support chassis 202. Wheels, rails, coasters or other positioning members may be affixed to the bottom of the single pipe fuser 214 to allow a user to position the single pipe fuser 214 in a position to weld each pipeline 212a,b. In one embodiment the single pipe fuser 214 remains stationary on the support chassis and the pipe sections 224 are positioned to align with the single pipe fuser 214. In such an embodiment a first pipe section 224 is fed into the single pipe fuser 214, aligned with a first pipeline 212a, and fused to the first pipeline 212a to elongate the first pipeline 212a. The first pipeline 212a is then removed from the single pipe fuser and a second pipe section 224 is then fed into the single pipe fuser 214 and fused with a second pipeline 212b.

In the embodiment illustrated in FIG. 9 the one or more positioning members 902 provide a mechanism to move the single pipe fuser 214 into multiple positions on the support chassis 202 to fuse the pipelines 212. In one embodiment the positioning members 902 are rails upon which the single pipe fuser 214 slides. The rails allow the single pipe fuser to be moved forward and backward as well as side to side. As discussed above, the positioning members 902 are not limited to rails and in alternative embodiments may comprise wheels, coasters, cables, or other positioning devices. In certain embodiments the base of the single pipe fuser 214 may be smooth enough or may include skids to allow the single pipe fuser 214 to be slid around on the surface of the support chassis 202. In such an embodiment the base or skids of the single pipe fuser 214 may comprise the positioning member 902. Additionally, in one embodiment the positioning member 902 may be an arm attached to the single pipe fuser 214. The arm may be connected to the single pipe fuser 214 such that the arm holds the single pipe fuser at some distance above the surface of the support chassis 202. The arm may swing forward and backward as well as side to side with respect to the support chassis 202. Thus, the arm may position the single pipe fuser 214 in a position to fuse each pipeline 212a,b.

In certain embodiments the positioning member 902 is not limited to forward, backward and side to side movement but also includes vertical movement relative to the support chassis 202. Thus, in one embodiment the positioning member 902 positions the single pipe fuser 214 in different vertical planes to fuse a pipe section 224 to a pipeline 212a,b. Of course, in such an embodiment one or more keepers 232 may be arranged to align the pipe section 224 with the pipeline 212 at different vertical planes.

Transportation facilitation members 204 are illustrated as wheels in FIG. 9. However, in certain embodiments the transportation facilitation members 204 may comprise tracks, rails, a sled or sleds, skids or the like as described above. In one embodiment the transportation facilitation members 204 may comprise a raft, pontoon or other buoyant apparatus for supporting the support chassis 202 on water. Thus, it is envisioned that in certain embodiments the current invention may be used to fuse pipelines 212 over water or at sea.

Pipe alteration platform 908 provides an area off the ground for adhering the spacers 400 or affixing the tie-ins 110 (i.e Ts, Ys, or the like) to the pipelines 212a,b. In one embodiment the pipe alteration platform 908 is positioned at substantially the same plane as the surface of the support chassis 202 to align the tie-in 110 or spacer 400 with the pipeline 212a,b. The pipe alteration platform 908 may also be located behind the pipe fuser 214 to allow a tie-in 110 or spacer 400 to be adhered to the pipeline 212a,b before the pipeline 212a,b is laid on the ground or in the ditch. This reduces the dirt and debris that may be introduced into the joint of fused area.

One or more pipeline guides 904 are positioned to receive the fused pipeline 212 and either feed and direct the pipeline 212 into the ditch 218 or place the pipeline 212a,b on the ground or other surface. In certain embodiments the pipeline guides 904 are omitted and the pipeline 212a,b simply falls to the ground or other surface once the pipe section 224 has been fused to the pipeline 212a,b.

In certain embodiments the system 900 may be used on uneven terrain. Thus, in certain embodiments the entry platform 226 may be in a different plane than the support chassis 202 when the system 900 crests a hill. To align the pipe sections 224 with the pipelines 212a,b the pipe section guides 906 guide the pipe sections 224 into alignment with pipelines 212a,b. In the embodiment illustrated in FIG. 9 four pipe section guides 906 are shown. However, one skilled in the art will recognize that in certain embodiments more of less than four pipe section guides 906 may be used. For example in certain embodiments only the pipe section guides 906 on the support chassis 202 may be used. Similarly, in one embodiment additional pipe section guides 906 may be used to help guide pipe sections 224 into the pipe fuser 214. In certain embodiments positions of the pipe section guide 906 and the pipeline guide 908 are adjustable using set screws or other adjustable fasteners to accommodate for surface variations.

Figure 10:
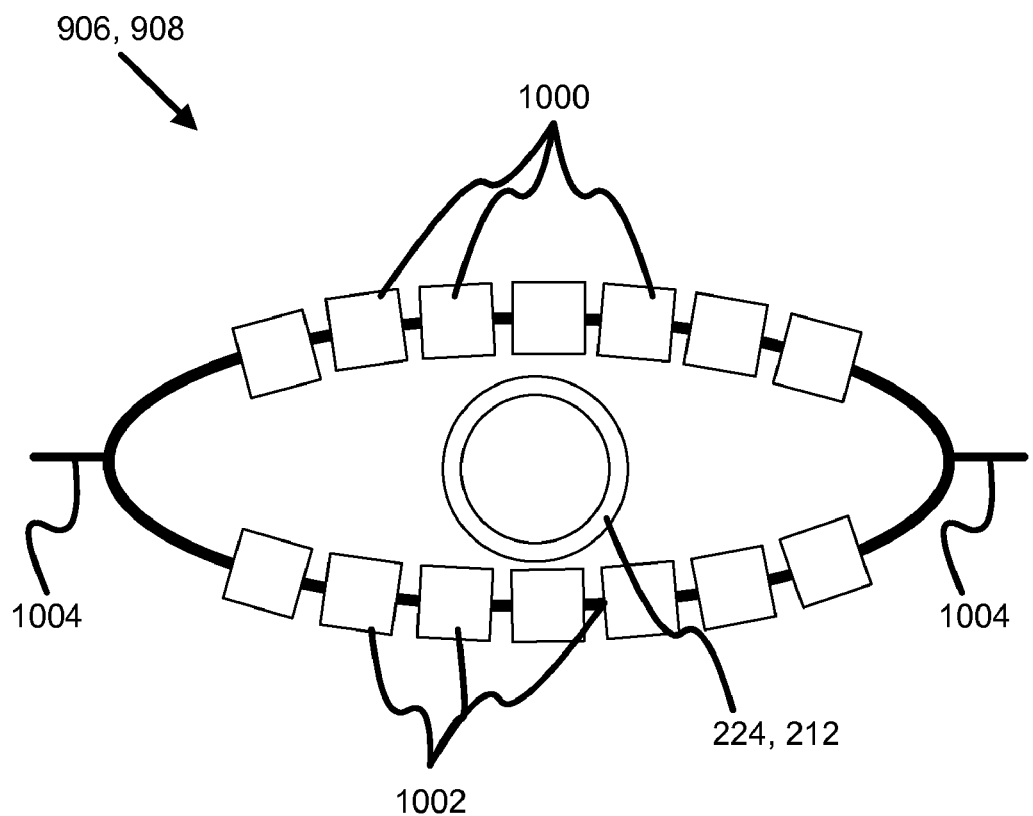
FIG. 10 is an illustration depicting an end view of a guide for guiding a pipe section or a pipeline in accordance with one embodiment of the current invention.

FIG. 10 illustrates an end view of one embodiment of a pipe section guide 906 or a pipeline guide 908. In certain embodiments the pipe section guide 906 includes a top set of rollers 1000, a bottom set of rollers 1002 and mounting flanges 1004. The mounting flanges 1004 mount the pipe section guide 906 or the pipeline guide 908 to the system 900. The mounting flanges 1004 may be secured to one or more U or Y shaped arms that extend up from the support chassis 202, entry platform 206, exit platform 208, and/or pipe alteration platform 908. The rollers 1000,1002 allow the pipe section 224 to roll through the pipe section guide 906. In certain embodiments a motor may engage the rollers 1000,1002 to facilitate the movement of pipe section 224 through the pipe section guide 906. The top set of rollers 1000 ensure that the pipe section 224 does not travel too high such as where the support chassis 202 is positioned lower than the entry platform 226. In one embodiment the top set of rollers 1000 maintains the pipe section 224 within the pipe section guide 906 when the system 900 is moving. In certain embodiments the pipeline guide 908 is fashioned in substantially the same manner as the pipe section guide 906. Thus, in certain embodiments the top set of rollers 1000 and bottom set of rollers 1002 facilitate the movement of the pipeline 212 through the pipeline guide 908.

Figure 11:
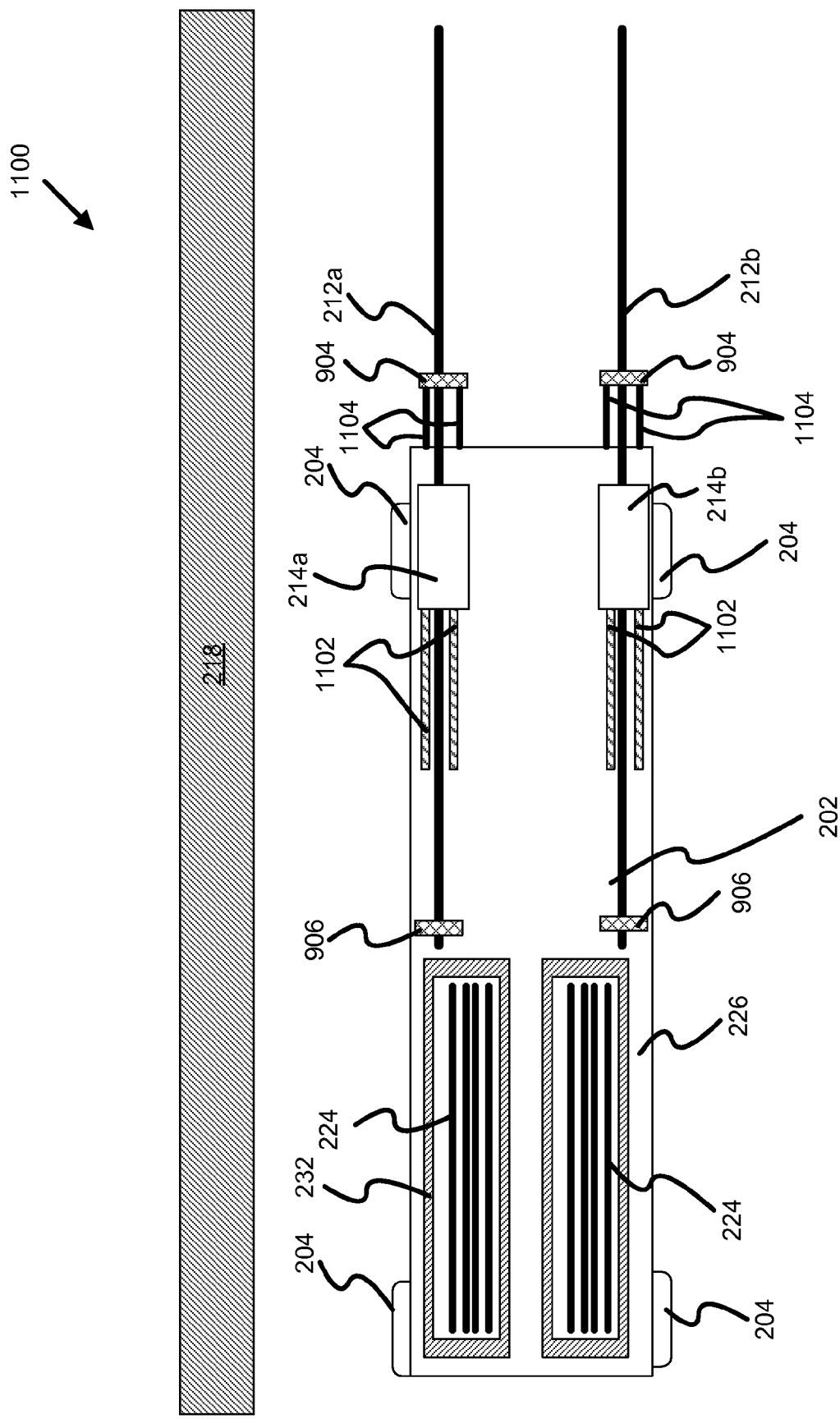
FIG. 11 is an illustration depicting a top view of a dual pipe fuser embodiment in accordance with one embodiment of the current invention.

FIG. 11 illustrates an embodiment of a system 1100 for concurrently forming at least two pipelines 212a,b according to the current invention. The system 1100 is substantially similar to the system 900 of FIG. 9 with the following differences. The system 110 includes two pipe fusers 214a,b rather than a single pipe fuser 214 as discussed in reference to FIG. 9. The positions of the two pipe fusers 214 of system 1100 are adjustable on the support chassis 202 by one or more positioning members 1102. In the embodiment illustrated in FIG. 11, the positioning members 1102 are illustrated as rails that allow the pipe fusers 214a,b to slide forward and backward on the support chassis 202. However, as discussed above, the positioning members 1102 may comprise wheels and/or allow additional lateral or vertical movement in certain embodiments. Further, in certain embodiments the positioning members 1102 may be attached to the pipe fusers 214a,b rather than the support chassis 202.

In the embodiment illustrated in FIG. 11 the entry platform 226 is integrated with the support chassis 202. In one embodiment an exit platform (not shown in FIG. 11) may also be integrated with the support chassis 202. The pipe alteration platform (not shown in FIG. 11) may also be integral with the support chassis 202 in certain embodiments as discussed above.

In one embodiment, one or more pipeline guides 904 are connected to the support chassis by pipeline guide extenders 1104. The pipeline guide extenders 1104 are configured to extend from the support chassis 202 to support the pipeline 212a,b as it is lowered to the ground or into the ditch 218. In certain embodiments the pipeline extenders 1104 may be a rigid rod adjustably received within a sleeve such that the rigid rod may be inserted or withdrawn from the sleeve to adjust the position of the pipeline guides 904.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 12:
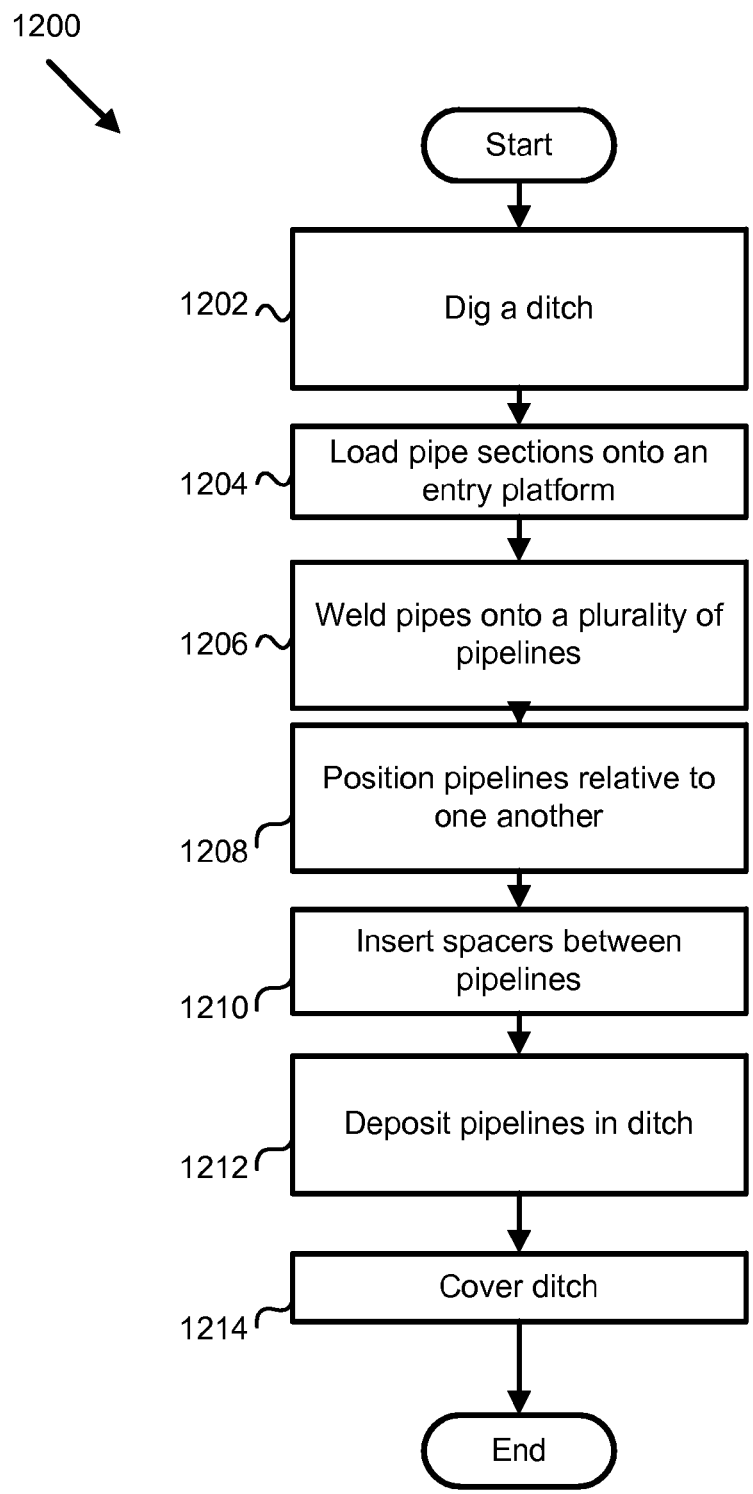
FIG. 12 is schematic flow chart illustrating one embodiment of a method for simultaneously laying a plurality of pipelines in accordance with the present invention.

Turning now to FIG. 12 which illustrates a flow chart diagram showing the steps involve in a method 1200 for laying one or more pipelines 212 in accordance with the present invention. The process starts and a ditch 218 is dug 1202 to a predetermined width and depth depending on what the pipelines 212 will carry. For instance, where a pipeline 212 will carry water the pipeline 212 must be placed below the frost depth. This depth varies depending on the climate and ground characteristics. Pipe sections 224 are loaded 1204 onto an entry platform 226 for fusion to a pipeline 212. In certain embodiments the pipe sections 224 may be pre-strung along the side of the ditch 218. Where the pipe sections 224 are pre-strung step 1204 may be eliminated from the process. The pipe sections 224 are fused 1206 onto one or more pipelines 212a,b in a pipe fuser 214 such as described above. In certain embodiments the fused pipelines 212 are positioned 1208 relative to one another (i.e. vertical or horizontal) and a spacer 400 is inserted 1210 between the pipelines 212 to maintain separation between the two or more pipelines 212. In one embodiment, the spacers 400 is configured to maintain a six (6) inch gap between each pipeline 212. In certain embodiments of the current invention the pipelines 212 may be laid horizontally within a ditch 218 thus eliminating the need to position 1208 the pipelines 212a,b substantially on top of one another. The pipelines 212a,b may then be deposited 1212 within a ditch 218 and the ditch 218 may be covered 1214 with dirt or other appropriate material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for concurrently forming a plurality of pipelines, the apparatus comprising:
   a support chassis;
   at least one transportation facilitation member coupled to the support chassis, the at least one transportation facilitation member facilitating the movement of the support chassis along a surface;

a pipe fuser disposed on the support chassis, the pipe fuser configured to fuse a first section of pipe to a first pipeline, the pipe fuser configured to independently fuse a second section of pipe to a second pipeline, wherein the pipe fuser forms two fused pipelines at substantially the same rate; and a positioning member disposed on the support chassis, the positioning member engaging one or more of the pipe fuser and the support chassis to position the pipe fuser in a first position to fuse the first section of pipe to the first pipeline, the positioning member further configured to position the pipe fuser in a second position to fuse the second section of pipe to the second pipeline.

2. The apparatus of claim 1, wherein the first section of pipe and the first pipeline are of a different size than the second pipe section and second pipeline.

3. The apparatus of claim 1, further comprising a second pipe fuser disposed on the support chassis, the pipe fuser positioned and configured to fuse the first section of pipe to the first pipeline and the second pipe fuser positioned and configured to fuse the second section of pipe to the second pipeline.

4. The apparatus of claim 1, further comprising one or more pipe section guides connected to the support chassis, the pipe section guides configured to align a section of pipe with a pipeline for fusion of the section of pipe to the pipeline by the pipe fuser.

5. The apparatus of claim 1, further comprising one or more pipeline guides connected to the support chassis, the pipeline guides positioned to support and align the pipeline for fusion of the pipe section to the pipeline by the pipe fuser.

6. The apparatus of claim 5, wherein the pipeline guide is further configured to direct the pipelines and to deposit the fused pipelines into a ditch, the fused pipelines positioned within the ditch such that the fused pipelines are substantially vertically oriented with respect to each other.

7. The apparatus of claim 1, further comprising a ditch digger configured to pull the support chassis forward along the surface, the ditch digger configured to dig at least one ditch, the at least one ditch proportioned to receive the fused pipelines.

8. The apparatus of claim 1, wherein the support chassis is proportioned to span a ditch, the ditch proportioned to receive the fused pipelines.

9. The apparatus of claim 1, further comprising an entry platform coupled to the support chassis, the entry platform transporting a plurality of unfused sections of pipe, the entry platform comprising a base and one or more keepers configured to retain the plurality of unfused sections of pipe off of the surface.

10. The apparatus of claim 1, further comprising a pipe alteration platform coupled to the support chassis, the pipe alteration platform disposed above the surface and aligned to position a spacer in line with one of the first pipeline and the second pipeline, the spacer placed between the fused pipelines to maintain a predefined separation distance between the fused pipelines.

11. An apparatus for concurrently forming a plurality of pipelines, the apparatus comprising:

a support chassis;

at least one transportation facilitation member coupled to the support chassis, the at least one transportation facilitation member facilitating the movement of the support chassis along a surface;

a first pipe fuser disposed on the support chassis, the first pipe fuser fusing a first section of pipe to a first pipeline by heating an end of the first section of pipe and an end of first pipeline and holding the first section of pipe in a mating relationship with the first pipeline to fuse the first section of pipe to the first pipeline; and a second pipe fuser disposed on the support chassis, the second pipe fuser comprising a pipe fuser that independently fuses a second section of pipe to a second pipeline by heating an end of the second section of pipe and an end of second pipeline and holding the second section of pipe in a mating relationship with the second pipeline to fuse the second section of pipe to the second pipeline, the second pipe fuser being separate from the first pipe fuser.

12. The apparatus of claim 11, wherein the first pipe fuser fuses the first section of pipe to the first pipeline with the support chassis in a stationary position and the second pipe fuser independently fuses the second section of pipe to the second pipeline with the support chassis remaining in the same stationary position.

13. The apparatus of claim 11, further comprising one or more positioning members disposed on the support chassis, each positioning member engaging one or more of a pipe fuser and a support chassis to position the first pipe fuser in a position to fuse the first section of pipe to the first pipeline and to position the second pipe fuser in a second position to fuse the second section of pipe to the second pipeline.

14. The apparatus of claim 11, further comprising a pipe section guide connected to the support chassis, the pipe section guide configured to align a section of pipe with a pipeline for fusion to the pipeline by a pipe fuser.

15. The apparatus of claim 11, further comprising a pipeline guide connected to the support chassis, the pipeline guide positioned to support and align the pipeline for fusion of the pipe section to the pipeline by a pipe fuser, the pipeline guide configured to direct and to deposit the fused pipelines into a ditch the fused pipelines positioned within the ditch such that the fused pipelines are substantially vertically oriented with respect to each other.

16. The apparatus of claim 11, further comprising an entry platform attached to the support chassis, the entry platform transporting a plurality of unfused sections of pipe, the entry platform comprising a base and one or more keeper configured to retain the plurality of unfused sections of pipe off of the surface.

17. A system for concurrently forming a plurality of pipelines, the system comprising:

a support chassis;

at least one transportation facilitation member coupled to the support chassis, the at least one transportation facilitation member facilitating the movement of the support chassis along a surface;

a motor coupled to the support chassis and the at least one transportation facilitation member;

an entry platform coupled to the support chassis, the entry platform transporting a plurality of unfused sections of pipe, the entry platform comprising a base and one or more keepers configured to retain the plurality of unfused sections of pipe off of the surface;

a first pipe fuser disposed on the support chassis, the first pipe fuser configured to fuse a first section of pipe to a first pipeline by heating an end of the first section of pipe and an end of first pipeline and holding the first section of pipe in a mating relationship with the first pipeline to fuse the first section of pipe to the first pipeline; and a second pipe fuser disposed on the support chassis, the second pipe fuser comprising a pipe fuser configured to independently fuse a second section of pipe to a second pipeline by heating an end of the second section of pipe and an end of second pipeline and holding the second section of pipe in a mating relationship with the second pipeline to fuse the second section of pipe to the second pipeline, the second pipe fuser being separate from the first pipe fuser.

18. The system of claim 17, further comprising at least one pipe section guide connected to the support chassis, the at least one pipe section guide configured to align the first section of pipe with the first pipeline for fusion to the first pipeline by the first pipe fuser, the at least one pipe section guide further configured to align the second section of pipe with the second pipeline for fusion to the second pipeline by the second pipe fuser.

19. The system of claim 17, wherein the first section of pipe and the first pipeline are a substantially different size than the second pipe section and second pipeline, the first pipe fuser configured to accommodate the size of the first section of pipe and the first pipeline and the second pipe fuser configured to accommodate the size of the second section of pipe and the second pipeline.

20. The system of claim 17, further comprising a pipeline guide connected to the support chassis, the pipeline guide positioned to support and align the first pipeline for fusion of the first pipe section to the pipeline by the first pipe fuser, the pipeline guide positioned to support and align the second pipeline for fusion of the second pipe section to the second pipeline, wherein the pipeline guide is further configured to direct and deposit the fused first pipeline and the fused second pipeline into a ditch, the first pipeline positioned within the ditch substantially above the second pipeline such that the first pipeline and the second pipeline are vertically oriented with respect to each other.

* * * * *